US008982151B2

(12) United States Patent
Tardif et al.

(10) Patent No.: US 8,982,151 B2
(45) Date of Patent: Mar. 17, 2015

(54) INDEPENDENTLY PROCESSING PLANES OF DISPLAY DATA

(75) Inventors: John Tardif, Sammamish, WA (US); Mark S. Grossman, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 483 days.

(21) Appl. No.: 12/815,248

(22) Filed: Jun. 14, 2010

(65) Prior Publication Data

US 2011/0304713 A1 Dec. 15, 2011

(51) Int. Cl.
*G09G 5/00* (2006.01)
*G06F 3/14* (2006.01)

(52) U.S. Cl.
CPC ...... *G06F 3/1423* (2013.01); *G09G 2340/0407* (2013.01); *G09G 2340/08* (2013.01); *G09G 2340/12* (2013.01)
USPC ........... 345/629; 345/619; 345/419; 345/428; 345/660; 345/669; 345/501; 345/506; 345/670; 386/353

(58) Field of Classification Search
CPC . G06T 15/20; G06T 2210/36; G06T 2210/52; G06T 13/00; G06T 15/00
USPC ......... 345/419, 613, 699, 428, 619, 629, 501, 345/506, 660, 669, 670; 386/95, 353
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |

(Continued)

FOREIGN PATENT DOCUMENTS

| | | |
|---|---|---|
| CN | 1379953 A | 11/2002 |
| CN | 101438579 A | 5/2009 |

(Continued)

OTHER PUBLICATIONS

"Silicon Imaging Digital Cinema Cameras go 3D", Retrieved at << http://www.studiodaily.com/main/news/10777.html , Apr. 15, 2009, pp. 2.

(Continued)

*Primary Examiner* — Jin-Cheng Wang

(74) *Attorney, Agent, or Firm* — Jeremy Snodgrass; Judy Yee; Micky Minhas

(57) ABSTRACT

Independently processing planes of display data is provided by a method of outputting a video stream. The method includes retrieving from memory a first plane of display data having a first set of display parameters and post-processing the first plane of display data to adjust the first set of display parameters. The method further includes retrieving from memory a second plane of display data having a second set of display parameters and post-processing the second plane of display data independently of the first plane of display data. The method further includes blending the first plane of display data with the second plane of display data to form blended display data and outputting the blended display data.

20 Claims, 6 Drawing Sheets

(56) References Cited

U.S. PATENT DOCUMENTS

| | | | |
|---|---|---|---|
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,841,439 A * | 11/1998 | Pose et al. ............ 345/418 |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,079,157 B2 * | 7/2006 | Deering ............ 345/613 |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,433,885 B2 | 10/2008 | Jones |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |

(56) References Cited

U.S. PATENT DOCUMENTS

| | | | |
|---|---|---|---|
| 7,710,391 B2 | 5/2010 | Bell et al. | |
| 7,729,530 B2 | 6/2010 | Antonov et al. | |
| 7,746,345 B2 | 6/2010 | Hunter | |
| 7,760,182 B2 | 7/2010 | Ahmad et al. | |
| 7,809,167 B2 | 10/2010 | Bell | |
| 7,834,846 B1 | 11/2010 | Bell | |
| 7,852,262 B2 | 12/2010 | Namineni et al. | |
| RE42,256 E | 3/2011 | Edwards | |
| 7,898,522 B2 | 3/2011 | Hildreth et al. | |
| 8,035,612 B2 | 10/2011 | Bell et al. | |
| 8,035,614 B2 | 10/2011 | Bell et al. | |
| 8,035,624 B2 | 10/2011 | Bell et al. | |
| 8,072,470 B2 | 12/2011 | Marks | |
| 2005/0068346 A1* | 3/2005 | Ogawa et al. | 345/699 |
| 2005/0231502 A1* | 10/2005 | Harper et al. | 345/418 |
| 2006/0164411 A1 | 7/2006 | Lee | |
| 2007/0236493 A1* | 10/2007 | Horiuchi et al. | 345/419 |
| 2008/0026838 A1 | 1/2008 | Dunstan et al. | |
| 2009/0189974 A1 | 7/2009 | Deering | |
| 2010/0142924 A1* | 6/2010 | Yamashita et al. | 386/95 |
| 2011/0032252 A1* | 2/2011 | Ohta | 345/419 |
| 2011/0069153 A1* | 3/2011 | Nakane | 348/43 |
| 2011/0211815 A1* | 9/2011 | Yamashita et al. | 386/353 |

FOREIGN PATENT DOCUMENTS

| | | |
|---|---|---|
| CN | 201254344 B | 6/2010 |
| EP | 0583061 A2 | 2/1994 |
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Triolet, Damien., "Report: immersion in gaming with 3D Vision and Eyefinity—BeHardware", Retrieved at << http://www.behardware.com/art/imprimer/776/ >>, Dec. 1, 2009, pp. 37.

"SIGGRAPH 2008: A Student Perspective", Retrieved at << http://www.cgw.com/Print.aspx?Page=/Press-Center/News/2008/SIG-GRAPH-2008-A-Student-Perspective.aspx >>, Aug. 27, 2008, pp. 11.

Hanlon, Sebastian., "Visualizing Three-Dimensional Graph Drawings", Retrieved at << http://greatbig.sandwich.net/thesis.pdf >>, 2006, pp. 118.

"DepthQ®Capture™ for Stereoscopic Media", Retrieved at << http://www.depthq.com/pdf/DepthQ%20Capture%20WEB.pdf >>, Retrieved Date: Apr. 14, 2010, pp. 2.

"p2gStereoStage™ Flash Applet", Retrieved at << http://www.proggies2go.org/pages/p2gStereoStage.html >>, Retrieved Date: Apr. 15, 2010, pp. 7.

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shag et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, Vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

"Notice of Third Office Action", Chinese Patent Application No. 201110170889.4 mailed Apr. 28, 2014, 7 pages.

The State Intellectual Property Office of the People's Republic of China, Fourth Office Action and Search Report Issued in Chinese Patent Application No. 201110170889.4, Sep. 16, 2014, 13 Pages.

* cited by examiner

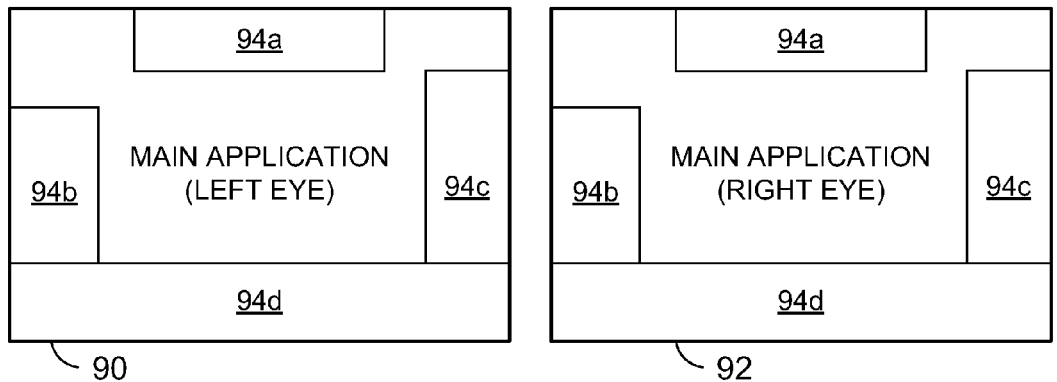
FIG. 3
FIG. 4
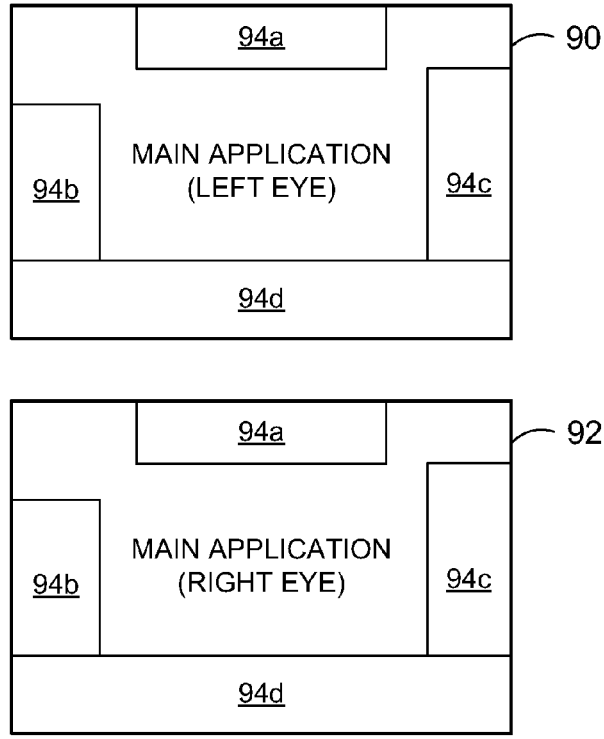

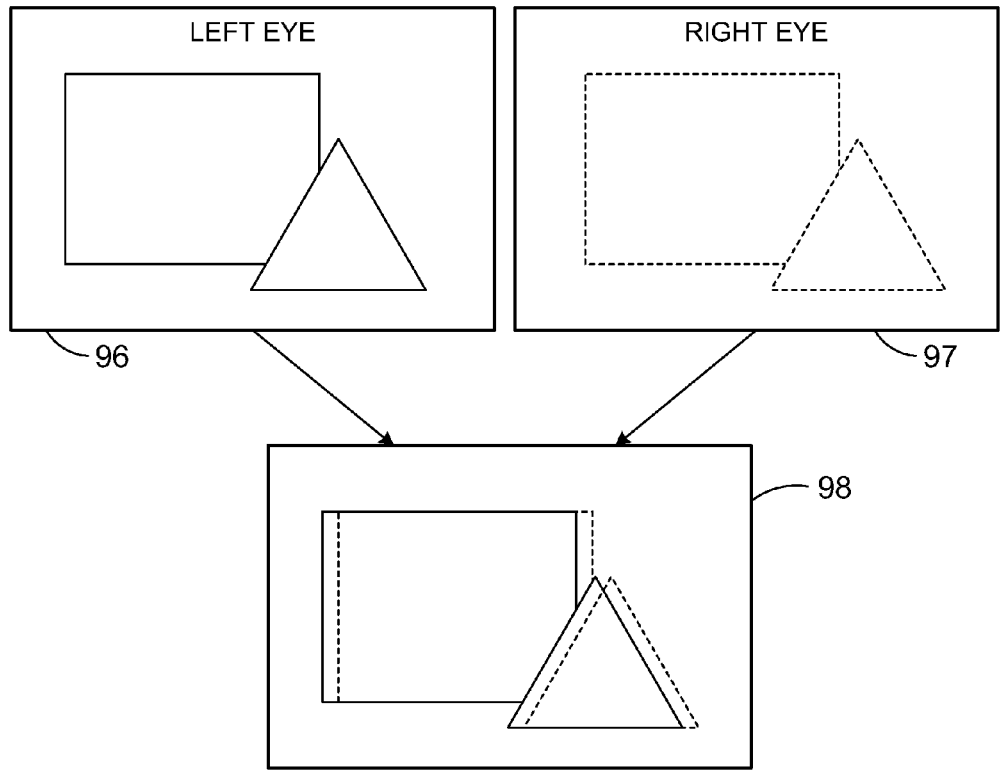
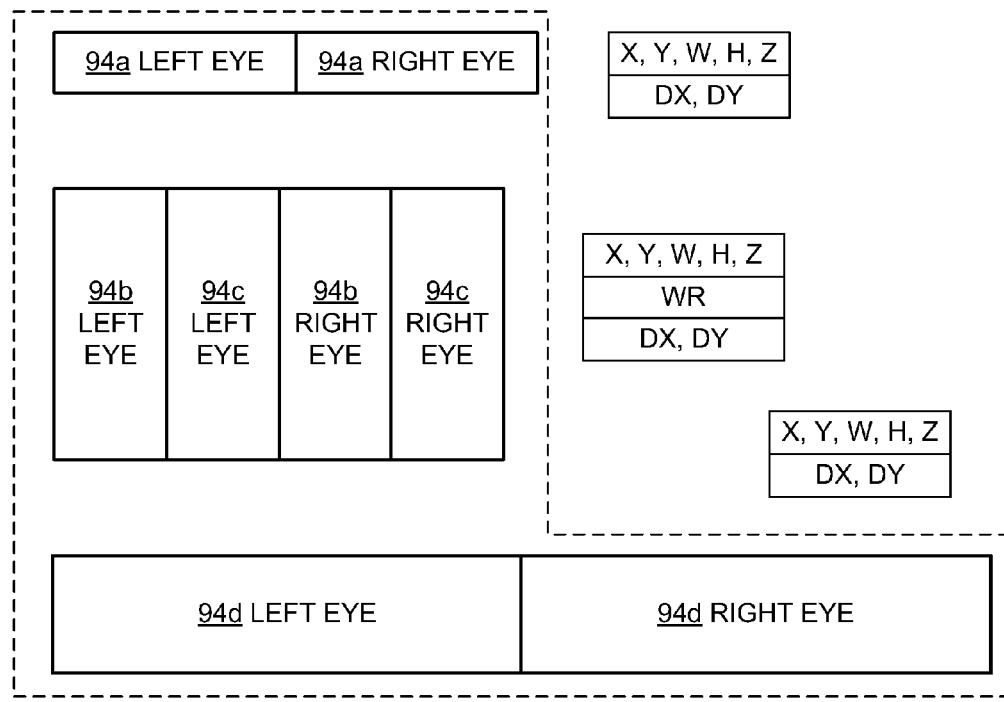

INDEPENDENTLY PROCESSING PLANES OF DISPLAY DATA

BACKGROUND

It is generally thought that video content items, such as rendered graphics in video games, are of higher quality when displayed at relatively high resolutions with relatively high refresh rates. However, when device hardware is strained by complicated rendering, refresh rates may suffer. While resolution may be sacrificed in order to maintain a desirable refresh rate, rendering at lower resolutions may result in an unfavorable viewing experience if the content appears noticeably degraded (e.g., pixelated). By contrast, other video content items, such as text overlays and graphical user interface (GUI) elements, are known to suffer quality degradation when rendered at lower resolutions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

According to one aspect of this disclosure, a method of outputting a video stream is provided. The method includes retrieving from memory a first plane of display data having a first set of display parameters and post-processing the first plane of display data to adjust the first set of display parameters. The method further includes retrieving from memory a second plane of display data having a second set of display parameters and post-processing the second plane of display data independently of the first plane of display data. The method further includes blending the first plane of display data with the second plane of display data to form blended display data and outputting the blended display data.

BRIEF DESCRIPTION OF THE DRAWINGS

FIG. 3 schematically shows an example of side-by-side packing of a frame buffer.

FIG. 4 schematically shows an example of over/under packing of a frame buffer.

FIG. 5 schematically shows an example of creating three-dimensional display data from a left eye perspective and a right eye perspective.

FIG. 6 schematically shows an example of structuring regions in frame buffer memory to support display-agnostic rendering.

DETAILED DESCRIPTION

As introduced above, in some cases resolution may be sacrificed in order to maintain a desirable update rate for rendered content, yet maintaining a high display refresh rate so as to avoid flickering. As an example, video may be rendered at a slightly lower resolution to decrease the effective pixel rate, which allows the graphics processing unit (GPU) of a device to render at a faster refresh rate. However, different types of content may be noticeably more or less affected than other types of content when resolution is decreased. For example, a video game displaying fast moving game content (e.g., a battle scene) may not yield noticeable visual artifacts when the resolution is lowered to maintain a desired refresh rate, whereas a heads up display (HUD) having detailed and relatively static content, such as text, a chat window, etc., may become noticeably pixelated at a lower resolution.

Traditionally a hardware scaler may be utilized to allow developers to render to a desired resolution, and then system software can provide the rendered data to a resolution associated with the display to which the video is being output. However, such a hardware scaler cannot isolate rendering resolution so as to distinguish between content, such as, for example, content of a main display and content of a HUD.

Independently processing planes of display data as described herein provides for independent scaling of the resolution of different portions of content. Since the portions of the video content may be independently scaled, a main set of display data may be scaled independently from HUD data, for example. Further, by storing display data in a display-agnostic format, and then packing a frame buffer for display-specific rendering, video output to various displays having various specifications, including displays configured to provide three-dimensional display of video (3D displays) is supported.

Figure 1:
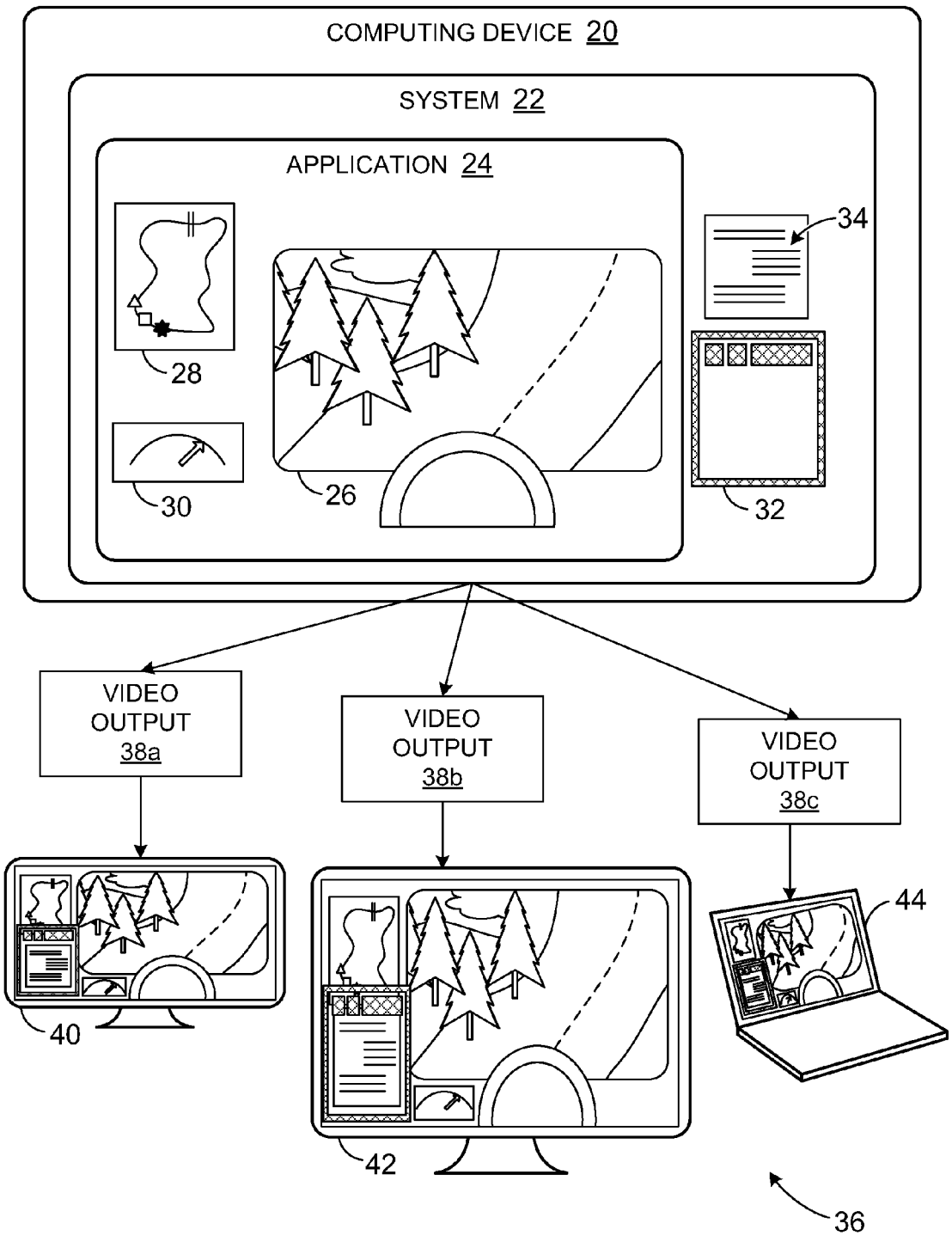
FIG. 1 schematically shows video output in accordance with embodiments of the present disclosure.

Turning now to FIG. 1, FIG. 1 shows a computing device 20 comprising a system 22 such as an operating system providing application 24 (e.g., a driving game). Computing device 20 may be any suitable computing device configured to output stereo and/or non-stereo video content, including but not limited to a gaming console, a personal computer, a mobile device, etc.

Application 24 may include various components, such as a main display and application-generated peripherals which are typically associated with the content of the main display. In the depicted example, application 24 includes a driving game having a main display 26 displaying a view of the road from the perspective of the driver. Application 24 further includes HUD elements including a map 28 displaying the progress of the driver along the race course, as well as the progress of the driver's competitors. The application HUD further includes a speedometer display 30 displaying the speed of the driver's car. It can be appreciated that this example is somewhat schematic in illustration, and is not to be considered in a limiting sense.

Computing device 20 may be further configured to provide additional system-generated content, such as a system-generated main display and/or system-generated HUD. Examples of system-generated content include but are not limited to system messages, notifications, voice chat, video chat, text chat, etc. FIG. 1 depicts an example system-generated main display 32 and a system-generated HUD 34 comprising text associated with a text-chat taking place between the driver and a competitor.

FIG. 1 further shows computing device 20 outputting to various displays 36. Examples of displays 36 include computer monitors, televisions, 3D displays, etc. As such, each display may have different specifications as to how content is to be displayed on the display. For example, a display may have a display resolution indicating a number of distinct pixels that can be displayed in each dimension. As another example, a display may have a refresh rate indicating the number of times in a second that the display hardware draws data. As another example, a display may have an aspect ratio indicating the ratio of the physical picture width to the picture height.

Further, various displays may utilize different interfaces to receive content for display. Examples include but are not limited to Composite/Separate video (S-video), Component Video, Video Graphics Array (VGA), VGA, Digital Visual Interface (DVI), High-Definition Multimedia Interface (HDMI), DisplayPort, etc.

As will be described in more detail throughout, computing device 20 is configured to output video content to each display, wherein the content is configured for that display. As such, a content developer need not be aware of the display specifications, and may develop applications that render to buffers that are similarly configured. For example, computing device 20 may be configured to take display data (e.g., produced by graphics cores and/or other system components) and structure the data in frame buffer memory in a display-agnostic format. The computing device 20 may then dynamically pack the data into a frame buffer based on the display parameters associated with the display to which the computing device is outputting, as described in more detail with reference to FIG. 2.

Thus, as depicted in FIG. 1, computing device 20 may drive video output 38a to display 40, drive video output 38b to display 42, and drive video output 38c to display 44. From one to three of displays 40, 42, and 44 may be driven simultaneously. The video outputs have the same frame rate, resolution, and frame packing; however, application 24 may render using a chosen frame buffer packing and format that is independent of the specific packing and formatting expected by the display(s).

Further, video output such as video output 38a, 38b and/or 38c as provided by computing device 20 is configured to lessen memory resources for both main displays and overlays (e.g., HUDs), independently. As such, the rendering resolution of each may be independently and dynamically adjusted, to meet a standard display refresh rate. Thus, as an example, game content (e.g., a battle scene) can be scaled to a lower resolution while the HUD may be maintained at a higher resolution. In this way, the refresh rate can be maintained and a viewer's user experience is less likely to be affected and/or interrupted.

As introduced above, one or more of displays 36 may be further configured to provide content for three-dimensional viewing. Traditionally, rendering to 3D displays may be challenging in that different 3D displays may utilize different technologies for providing 3D views of content. As an example, a display may utilize stereoscopy technology which presents two views of the same scene, where one of the views is for the left eye of the user (e.g., a left frame) and the other view is for the right eye of the user (e.g., a right frame). As such, depth may be simulated on a flat display surface.

As such, various stereo 3D (S3D) displays and non-stereo displays may specify different instructions for receiving the two views (e.g., the left and right frames). As an example, a display may be configured to receive the views as packed side-by-side in a frame buffer. In such a case, for each output frame, one view is positioned in the left half of the frame and the other view is positioned in the right half of the frame. As another example, a display may be configured to receive the views as packed over/under in a frame buffer. In such a case, for each output frame, one view is positioned in the top half of the frame and the other view is positioned in the bottom half of the frame. Such instructions may be included within the specifications provided to the computing device. Computing device 20 is then configured to convert the application front buffer(s) and output the data over common video interfaces to the display device using video output architecture as described herein.

Computing device 20 may be configured to output video to displays 36 by, for example, taking the resulting frame-buffer(s) produced by the graphics cores and/or other system components, and performing post-processing and blending operations to format the buffer for display, as described in more detail with reference to FIG. 2. Further, a display output pipeline of computing device 20 may be configured to take side-by-side and/or left-right packed buffers/planes associated with 3D display, and apply separately determined pixel and line offsets and padding/spacing in order to drive the display's requested input.

As such, independently processing planes of display data as described herein provides for 3D source data to be rendered into the same buffer in memory in a consistent side-by-side format (e.g., left/right or image/depth) so that only one buffer allocation and pointer is maintained.

Further, computing device 20 may be further configured to provide a memory-saving ability by using a 2D source for 3D output by presenting differently shifted versions of the source to each eye, as described in more detail with reference to FIGS. 2-6. As such, display resolutions for a 2D source (e.g., 4096×2160) and display resolutions for each eye for 3D source (e.g., 2048×2160) can be supported.

In this way, an application need not know the specific interface format for the display. As such, the content is insulated from changes in output standards, 3D standards, etc.

Figure 2:
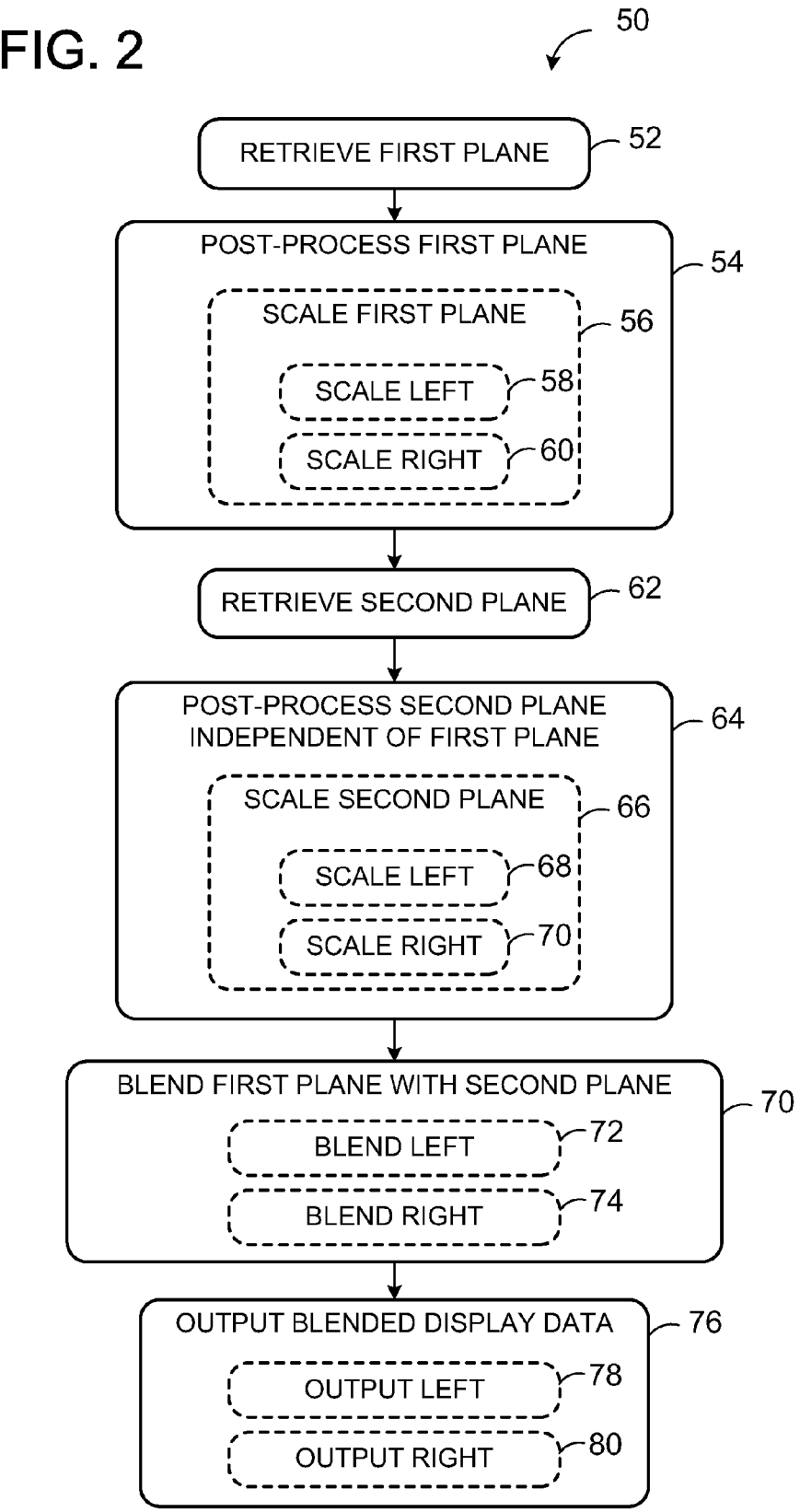
FIG. 2 shows a flow diagram for a method of outputting a video stream.

Turning now to FIG. 2, FIG. 2 illustrates a method 50 of outputting a video stream. At 52, method 50 includes retrieving from memory a first plane of display data having a first set of display parameters. It can be appreciated that "plane" as used herein refers to a plane (e.g., layer) of a 2D memory buffer, and thus is distinct from a plane in the traditional sense with respect to a plane of a 2D image. Planes may correspond to (e.g., be sourced by) application-generated display data or system-generated display data, resulting from, for example, frame-buffer(s) produced by the graphics core and/or other system components. Further, planes may be associated with various sources such as main sources, HUD sources, etc. and thus, the first plane may be any such suitable plane.

For example, the first plane may be an application main plane comprising an application-generated primary-application display surface for displaying primary application content (e.g., main screen of a driving game). As another example, the first plane may be a system main plane comprising a system-generated primary-system display surface for a computing system (e.g., a window displaying system messages).

The first plane has an associated first set of display parameters. Such display parameters indicate how display data of the plane is to be displayed. For example, display parameters could include resolution, color space, gamma value, etc. as described in more detail hereafter.

Further, the first plane may be retrieved in any suitable manner, such as by direct memory access (DMA). As an example, the DMA may retrieve front buffer contents from a main memory. As such, a system-on-a-chip (SoC) may be designed to deliver a favorable latency response to display DMA read and write requests. The memory requests may be issued over a dedicated memory management unit (MMU), or they may be interleaved over a port that is shared with the System GPU block requesters. The overhead of the GPU and SoC memory controllers may then be taken into account in the latency calculations in order to design a suitable amount of DMA read buffering and related latency hiding mechanisms. Display DMA requests may be address-based to main memory. All cacheable writes intended for the front buffers may optionally be flushed, either via use of streaming writes or via explicit cache flush instructions.

Continuing with FIG. 2, at 54, method 50 includes post-processing the first plane of display data to adjust the first set of display parameters, wherein post-processing includes scaling the display data of the first plane to adjust a resolution parameter, as indicated at 56. Post-processing may include any number of possible operations to prepare the data for subsequent compositing, as described in more detail hereafter.

In some embodiments, post-processing may include applying an input color space conversion. As introduced above, display data may have a color space parameter. As an example, for gaming and graphics, pixels may use an RGB color space. As another example, for video applications, pixels may use a YCbCr color space. Thus, applying an input color space conversation matches frame-buffer formats to a common color space for subsequent blending. By handling color space conversion of video formats appropriately, precision and range may be maintained to alleviate clamping and quantization artifacts.

Further, in some embodiments post-processing may include applying an inverse gamma correction. As introduced above, display data may have a gamma parameter used for coding luminance values. Applying an inverse gamma correction converts gamma corrected content into linear space, allowing for improved scaling results since the gamma parameter is typically susceptible to banding artifacts during output processing.

In this way, by applying an inverse color space conversion and/or inverse gamma correction, subsequent scaling and compositing can be done in a linear RGB color space. As an example, a YCbCr color space source material (e.g. DVD), may be converted to RGB via a color space conversion (CSC) and may then be converted to linear RGB via the inverse gamma block.

Further yet, the display data may be scaled in any suitable manner. Thus, 56 of method 50 may include applying a video scaler to change the resolution parameter. Such a video scaler may resample full motion video (FMV) and/or overlays for display. Further, in some embodiments, the video scaler may perform frame to field down-sampling for interlaced display support. The video scaler may display resolution matching when handling multiple output resolutions. As an example, an application may be configured to support PAL, NTSC and 720P. However, rather than have the application support these different resolutions and pixel aspect ratios natively, a smaller subset of resolutions may be rendered to, and then the render target may be resized before display, utilizing high quality filtering. In this way, functionality related to presenting content with one display aspect ratio (e.g., 4×3) on a display with a different display aspect ratio (e.g., 16×9) may be supported. Such functionality may further include letterbox presentation of 16×9 content on a 4×3 display, etc.

The video scaler may further provide for dynamic resolution adjustment based on system loading for fill limited applications. As such, the resampler may be configured to support arbitrary scaling factors, so as to yield minimal artifacts when dynamically changing scaling factors. Further, resampling may be independent on each of the sources of the planes. In such a case, a high quality 2D filter such as a high quality non-separable, spatially adaptive 2D filter may be desirable for a main plane, whereas non-adaptive, separable filters may be used for HUDs.

It should be appreciated that post-processing may additionally or alternatively include other processing without departing from the scope of this disclosure.

Further, in the case of post-processing display data for 3D display, post-processing may include scaling a left eye perspective and scaling a right eye perspective of the first plane of display data as indicated at 58 and 60 of method 50, respectively. Such scaling may include any suitable processing to prepare the two perspectives for output. In particular, it may not be desirable to allocate a full-sized frame buffer for each plane source. As such, a portion of the source region(s) that is used for display may be the entire source or may be a portion (e.g., a rectangular region) of the source (e.g., pan-and-scan, cropping, etc.). Further, the source content may occupy the entire active region of the display, or it may occupy a portion of the display (e.g., letterboxing). Source content that is off the active display region may be clipped (e.g., via register programming).

Thus, in order to save on memory footprint and bandwidth, it may be desirable to specify multiple non-overlapping sources that produce multiple sub-rectangles for a given plane. As an example, for 3D support and a "picture frame" HUD, multiple (e.g., eight) different sources of any size may be displayed, and may be placed anywhere on the display (e.g., desktop).

As an example, FIG. 3 illustrates a possible configuration for side-by-side left/right output of a left eye version 90 of the main application and a right eye version 92 of the main application. As an example, the main application may be a video game having several peripherals displayed via a HUD. The left eye version and right eye version of each item, namely item 94a (e.g., a score), item 94b (e.g., weapons), item 94c (e.g., direction/map) and item 94d (e.g., messages) may be packed side-by-side in their own reference buffers. For example, item 94a on the left eye version 90 and item 94a on the right eye version 92 may use source data that begins at a same memory buffer address, but having different horizontal offsets.

As another example, FIG. 4 illustrates a possible configuration for a frame-packed format. Here, the left eye version and the right eye version of each item may be packed over/under in their own reference buffers. For example, item 94a on the left eye version 90 and item 94a on the right eye version 92 may use source data that begins at a same memory buffer address, but with different vertical offsets.

The left eye and right eye perspectives may then be combined for display to simulate a 3D image. As an example, FIG. 5 shows combining a left eye perspective 96 and a right eye perspective 97, to yield video output 98.

Since different 3D displays utilize different display technologies, it is desirable to store display data in a display-agnostic format, and then package the video output as formatted for display-specific rendering. As such, scaling may further include packing a frame buffer for display-specific rendering.

This may be done in any suitable manner. For example, frame buffer memory associated with the first plane of display data and frame buffer memory associated with the second plane of display data may each be structured to support display-agnostic rendering. As such, scaling a left eye perspective or a right eye perspective of the first plane or the second plane may include referencing the frame buffer memory associated with that plane and formatting the left eye perspective or the right eye perspective of that plane for display-specific rendering.

In such a case, referencing the frame buffer may include obtaining regions of display data of that plane associated with a left eye or a right eye. As such, scaling the left eye perspective or the right eye perspective of that plane may include packing a frame buffer with data from the regions obtained via the frame buffer memory.

FIG. 6 illustrates such a possible approach for structuring the regions in frame buffer memory to support display-agnostic rendering, for the case of the example described above with reference to FIGS. 3-4. Three source rectangles may be utilized. In this way, independent left and right views of each region may be placed side-by-side. Both the GPU and the display output DMA are configured to understand the origin and dimensions (X, Y, W, H) of the rectangle for each eye, however, only the display output DMA is configured to understand the (DX, DY) (pixels, lines) that separate the two eyes in the output format.

In some embodiments, scaling may further include incorporating parallax into the left and right rendering on a pixel-by-pixel basis. In some embodiments, this may be a side effect of having separate left and right source planes. However, in some embodiments, parallax may be incorporated as a final horizontal pixel offset for each eye generated based on an offset parameter stored in a configuration register. This may be applicable without there being a left and right source plane in memory, but rather just a single plane ("perspective") plus an offset. As an example, the offset parameter may be based on the sum of the DX representing the display output width plus an offset based on the desired apparent depth (e.g., Z-offsets, represented as "Z" in FIG. 6). Furthermore, the width of each eye rectangle may be padded to facilitate memory tiling or output filter alignment restrictions.

By performing such post-processing on a per-plane basis, attributes of the sources (e.g. color space, size, location, etc.) can change on a frame by frame basis and therefore can be appropriately buffered to prevent bleeding/coherency/tearing issues. Thus, all display planes may be updated coherently.

Further, such post-processing allows the sources for each plane to be independent of the resolution of the display. In this way, all sources can change rendering dimensions on a frame-by-frame basis, allowing applications/system to seamlessly scale down render target dimensions as they get closer to running over their GPU budget, thus maintaining a consistent frame rate. As a possible use scenario for HDMI, a receiver may change the display that is used for output. In such a case, the display resolution changes by modifying the scaler parameters in lockstep for each source channel, without having to re-initialize the video output pipeline.

Returning to FIG. 2, at 62, method 50 includes retrieving from memory a second plane of display data having a second set of display parameters. It should be appreciated that such retrieval may coincide substantially simultaneously with retrieving the first plane.

The second plane may be any suitable plane configured for positioning over the first plane. For example, the second plane may be a system main plane. As another example, the second plane may be an application HUD comprising an application-generated overlay configured to draw elements at a constant resolution on top of scaled rendering of the first plane. As yet another example, the second plane may be a system-generated overlay configured to facilitate system communication and configured to be positioned over the first plane or blended as a translucent layer over the first plane.

At 64, method 60 includes post-processing the second plane of display data independently of the first plane of display data. As such, separate control is supported for each source allowing for quality/resource utilization to be enhanced.

Post-processing the second plane may include scaling the second plane, as indicated at 66, for example by applying a second video scaler. Post-processing may further include other processing such as applying a second input color space conversion, applying a second inverse gamma correction, etc. For the case of post-processing display data for 3D display, post-processing may include scaling a left eye perspective of a second plane of display data independently of the left eye perspective of the first plane of display data, and likewise, scaling a right eye perspective of the second plane of display data independently of the right eye perspective of the first plane of display data, as indicated at 68 and 70 of method 50, respectively.

At 72, method 50 includes blending the first plane of display data with the second plane of display data to form blended display data. This may be done in any suitable manner, such as by compositing.

For the case of blending planes for 3D display, blending may include blending the left eye perspective of the first plane of display data with the left eye perspective of the second plane of display data to form a left eye perspective of blended display data as indicated at 72, and blending the right eye perspective of the first plane of display data with the right eye perspective of the second plane of display data to form a right eye version of blended display data as indicated at 74.

At 76, method 50 includes outputting the blended display data. In some embodiments, the blended display data may be output to a video encoder. However, in some embodiments, content that is formatted and composited for output may be written back into memory for subsequent use, including possible video compression. The source may be taken from any blending stage, for example, to include or exclude system planes. Alternatively, for fuller flexibility, a separate set of blenders may be added. Such outputting to memory also provides a debug path for the display pipeline.

For the case of outputting video output for 3D display, outputting may include outputting the left eye perspective of blended display data and the right eye perspective of blended display data for three-dimensional display, as indicated at 78 and 80, respectively.

It should be appreciated that method 50 may further include additional processing without departing from the scope of this disclosure. For example, after blending, an output gamma correction may be applied to provide programmable, selectable conversion for linear space content into the gamma expected by the display device (e.g., sRGB gamma, BT.601/709 gamma, etc.).

As another example, method 50 may further include applying an output color space conversion. In this way, the composited, gamma corrected result may be matched to the output format required for display (e.g., BT.601, BT.709, RGB, xvYCC601, xvYCC709, etc.). Enough precision and range may be maintained to alleviate clamping and quantization artifacts. In addition to color space conversion, programmable coefficients may enable adjustments in contrast, saturation, hue, brightness, etc. using the same block.

It should be further appreciated that although output processing steps may be performed as either memory to memory operations by the GPU/CPU cores or on the fly during display rasterization by dedicated display hardware, concerns regarding system memory footprint and additional bandwidth requirements with the former approach may be further addressed. Thus, it will be appreciated that method 50 may include additional logic, such that the final partitioning achieves a balance between efficiency of the GPU for video processing, GPU chip die size, memory bandwidth and utilization.

Figure 7:
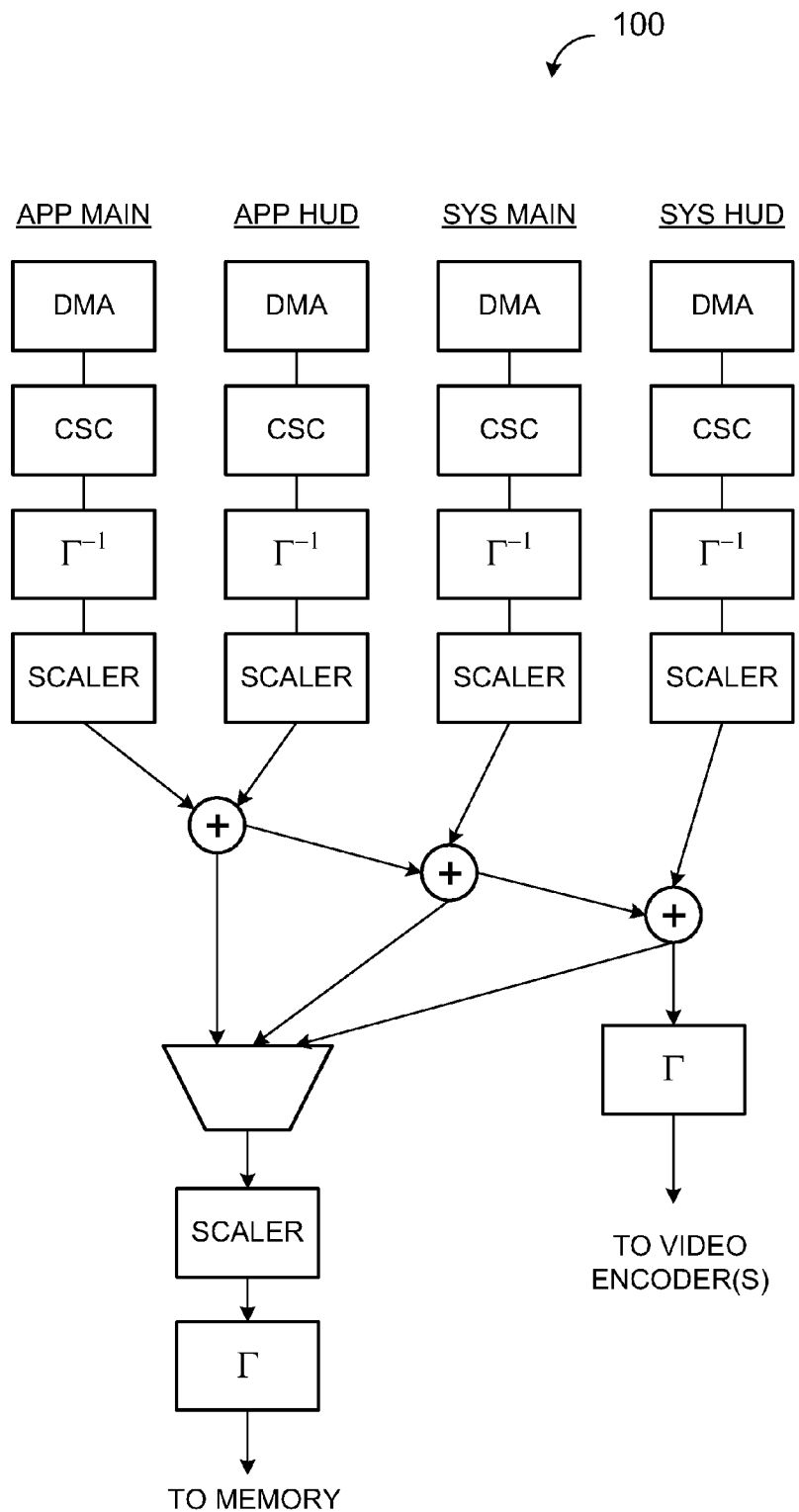
FIG. 7 schematically shows an example display pipeline for video output.

It should be appreciated that method 50 may further include receiving and post-processing additional planes, and blending these with the other post-processed planes for output. FIG. 7 illustrates a display pipeline 100 for four separate planes, namely an application main plane (App Main) comprising the primary application display surface, an application HUD plane (App HUD) comprising an application-generated overlay, a system main plane (Sys Main) comprising a primary system display surface, and a system HUD plane (Sys HUD) comprising a system-generated overlay, described in more detail as follows.

The App Main plane comprises the main surface to display for the application (front buffer). A source for this plane is underneath/behind the other planes. In some embodiments, per pixel alpha may not be supplied on this plane.

The App HUD plane then comprises an overlay to the App Main plane. The addition of such a source could potentially allow for eradication of frame drops caused by the GPU. In other words, the App Main source may change rendering dimensions on a frame-by-frame basis, with support for drawing the App HUD elements at a constant resolution on top of the scaled game rendering. In this way, developers can seamlessly scale down their render target dimensions as they get closer to running over their GPU budget so that they can maintain a consistent frame rate. This may be achieved since GPU render times tend not to change significantly from frame-to-frame. The HUD elements remain at a consistent resolution since it can be visually obvious and distracting to a user when those are dynamically scaled differently. The application may utilize the App HUD overlay for any output resolution, which further utilizes a scaler as shown.

The Sys Main plane comprises the main surface to display for the system software, including the operating system and any core set of programs and utilities. This plane may be positioned on top of the application planes (e.g., App Main and App HUD), but underneath the Sys HUD plane.

The Sys HUD plane comprises an overlay plane available to the system software. This plane may be positioned on top of the other planes. It may be used for system messages, notifications and for voice/video chat functionality. Having a scaler in the system overlay path can simplify the system resource allocation and performance reservations without dependencies on the title source resolutions, refresh rates, etc.

As such, each plane may have a different set of display parameters. Upon retrieval (e.g., via the DMA), the planes may then be post-processed independently of one another. As depicted, such post-processing may include a color space conversion (CSC), an inverse gamma correction ($\Gamma^{-1}$), and scaling.

The planes may then be blended (e.g., composited) to form blended display data. In the depicted example, the App Main plane is composited with the App HUD plane. The result in then composited with the Sys Main plane, and that result is composited with the Sys HUD plane. Alternatively, the App Main may be composited with App HUD, and the Sys Main may be composited with the Sys HUD, and the results may then be composited with one another.

In the depicted example, an output gamma correction is applied to blended display data and the result is then output to video encoder(s). The blended display data is also scaled for memory output, gamma corrected, and written back to memory for subsequent compression.

Figure 8:
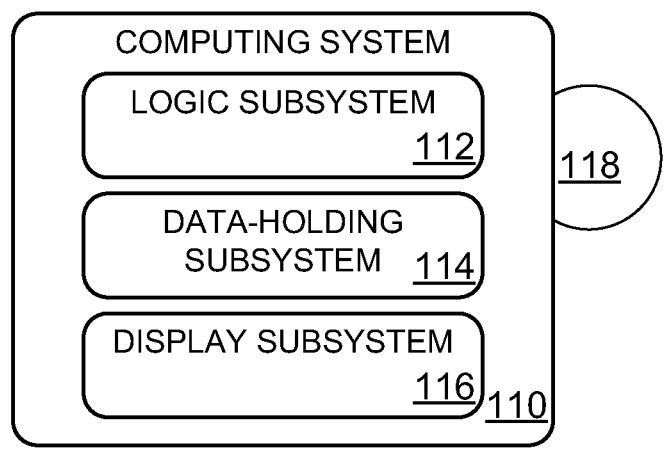
FIG. 8 schematically shows a computing device in accordance with embodiments of the present disclosure.

In some embodiments, the above described methods and processes may be tied to a computing system. As an example, FIG. 8 schematically shows a computing system 110 that may perform one or more of the above described methods and processes. Computing system 110 includes a logic subsystem 112 and a data-holding subsystem 114. Computing system 110 may optionally include a display subsystem 116 and/or other components not shown in FIG. 8.

Logic subsystem 112 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 114 may include one or more physical, non-transitory, devices configured to hold data and/or instructions executable by the logic subsystem to implement the herein described methods and processes. When such methods and processes are implemented, the state of data-holding subsystem 114 may be transformed (e.g., to hold different data). Data-holding subsystem 114 may include removable media and/or built-in devices. Data-holding subsystem 114 may include optical memory devices, semiconductor memory devices, and/or magnetic memory devices, among others. Data-holding subsystem 114 may include devices with one or more of the following characteristics: volatile, nonvolatile, dynamic, static, read/write, read-only, random access, sequential access, location addressable, file addressable, and content addressable. In some embodiments, logic subsystem 112 and data-holding subsystem 114 may be integrated into one or more common devices, such as an application specific integrated circuit or a system on a chip.

FIG. 8 also shows an aspect of the data-holding subsystem in the form of computer-readable removable media 118, which may be used to store and/or transfer data and/or instructions executable to implement the herein described methods and processes.

The terms "module" and "engine" may be used to describe an aspect of computing system 110 that is implemented to perform one or more particular functions. In some cases, such a module or engine may be instantiated via logic subsystem 112 executing instructions held by data-holding subsystem 114. It is to be understood that different modules and/or engines may be instantiated from the same application, code block, object, routine, and/or function. Likewise, the same module and/or engine may be instantiated by different applications, code blocks, objects, routines, and/or functions in some cases.

When included, display subsystem 116 may be used to present a visual representation of data held by data-holding subsystem 114. As the herein described methods and processes change the data held by the data-holding subsystem, and thus transform the state of the data-holding subsystem, the state of display subsystem 116 may likewise be transformed to visually represent changes in the underlying data. Display subsystem 116 may include one or more display devices utilizing virtually any type of technology. Such display devices may be combined with logic subsystem 112 and/or data-holding subsystem 114 in a shared enclosure, or such display devices may be peripheral display devices.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for outputting a video stream using a computing system, the method comprising:
    retrieving from memory a first plane of display data;
    retrieving from memory a second plane of display data;
    in response to nearing a graphics-processing budget of the computing system, decreasing a resolution of the first plane of display data while maintaining a predetermined frame rate of the first plane of display data to adhere to the graphics processing budget;
    independently maintaining a resolution of the second plane of display data while the resolution of the first plane of display data is decreased;
    blending the first plane of display data with the second plane of display data to form blended display data; and
    outputting the blended display data at or above the predetermined frame rate without exceeding the graphics processing budget.

2. The method of claim 1, further comprising applying input color space conversion independently to the first and/or second planes of display data to match frame-buffer formats of the first and second planes of display data to a common color space for the blending.

3. The method of claim 1, further comprising applying an inverse gamma correction independently to the first and/or second planes of display data to convert gamma-corrected content in the first and second planes of display data into linear space.

4. The method of claim 1, where the resolution of the first plane of display data is decreased by a first video scaler.

5. The method of claim 1, where the first plane of display data comprises an application-generated display surface, where the second plane of display data comprises a system-generated display surface, and where blending the first plane with the second plane comprises positioning the second plane over the first plane.

6. The method of claim 1, where the first plane of display data comprises an application-generated primary display surface, where the second plane comprises an application-generated overlay, and where blending the first plane with the second plane comprises positioning the second plane over the first plane.

7. The method of claim 1, where the first plane comprises a system-generated display surface, where the second plane comprises a system-generated overlay, and where blending the first plane with the second plane comprises positioning the second plane over the first plane.

8. The method of claim 1, where outputting the blended display data comprises outputting to a video encoder.

9. The method of claim 1, where the first plane of display data includes a left eye perspective and a right eye perspective, where the second plane of display data includes a left eye perspective and a right eye perspective, and where blending the first plane of display data with the second plane of display data includes blending a scaled version of the left eye perspective of the first plane with a scaled version of the left eye perspective of the second plane and blending a scaled version of the right eye perspective of the first plane with a scaled version of the right eye perspective of the second plane.

10. The method of claim 1 where the computing system includes a graphics processing unit (GPU), and where the graphics processing budget expresses bandwidth of the GPU.

11. A method for outputting three-dimensional display data using a computing device, the method comprising:
    recognizing a graphics processing budget of the computing device;
    in response to nearing the graphics-processing budget, scaling a left eye perspective of a first plane of display data to a lower resolution to adhere to the graphics-processing budget, and independently scaling a left eye perspective of a second plane of display data to a higher resolution;
    in response to the nearing the graphics-processing budget, scaling a right eye perspective of the first plane of display data to the lower resolution to adhere to the graphics-processing budget, and independently scaling a right eye perspective of the second plane of display data to the higher resolution;
    blending the left eye perspective of the first plane of display data with the left eye perspective of the second plane of display data to form a left eye perspective of blended display data;
    blending the right eye perspective of the first plane of display data with the right eye perspective of the second plane of display data to form a right eye perspective of the blended display data; and
    outputting to a three-dimensional display device the left eye perspective of the blended display data and the right eye perspective of the blended display data at or above a predetermined frame rate without exceeding the graphics processing budget.

12. The method of claim 11, where the first plane comprises an application-generated primary display surface, where the second plane comprises a head-up display element.

13. The method of claim 12, where the first plane comprises an application-generated primary display surface, where the second plane comprises a system-generated overlay, and where said blending comprises positioning the second plane over the first plane for the left and right eye perspectives.

14. The method of claim 12, where scaling comprises packing a frame buffer for display-specific rendering.

15. The method of claim 12, where frame buffer memory associated with the first plane of display data and frame buffer memory associated with the second plane of display data are each structured to support display-agnostic rendering, and where scaling the left eye perspective or the right eye perspective of the first plane or the second plane comprises referencing the frame buffer memory associated with that plane and formatting the left eye perspective or the right eye perspective of that plane for display-specific rendering.

16. The method of claim 15, where referencing the frame buffer memory associated with that plane comprises obtaining regions of display data of that plane associated with a left eye or a right eye in order to incorporate parallax on a pixel-by-pixel basis, and where scaling the left eye perspective or the right eye perspective of that plane comprises packing a frame buffer with data from the regions obtained via the frame buffer memory.

17. The method of claim 15, where scaling further comprises incorporating parallax in order to produce the right eye perspective as a final horizontal pixel offset applied to the region of display data associated with a left eye based on an offset parameter stored in a configuration register.

18. The method of claim 12, where scaling the right eye perspective of the first plane of display data comprises specifying a pixel offset with respect to the left eye perspective of the first plane of display data.

19. A method for outputting a video stream using a computing device, the method comprising:

recognizing a graphics processing budget of the computing device;

retrieving from memory a first plane of display data comprising application-generated moving content;

in response to nearing the graphics-processing budget, decreasing a resolution of the first plane of display data while maintaining a predetermined frame rate of the first plane of display data as the graphics processing budget to adhere to the graphics-processing budget;

retrieving from memory a second plane of display data comprising a static overlay to be positioned over the moving content;

independently maintaining a resolution of the second plane of display data while the resolution of the first plane of display data is decreased;

blending the first plane of display data with the second plane of display data to form blended display data; and outputting the blended display data to a video encoder at or above the predetermined frame rate without exceeding the graphics processing budget.

20. The method of claim 19 further comprising applying one or more of an input color space conversion, an inverse gamma correction, and a video scaler independently to the first and second planes of display data.

* * * * *